United States Patent Office 3,158,537
Patented Nov. 24, 1964

3,158,537
REPELLING BIRDS
Lyle D. Goodhue, Bartlesville, Kenneth E. Cantrel, Dewey, and Rector P. Louthan, Bartlesville, Okla., assignors to Phillips Petroleum Company, a corporation of Delaware
No Drawing. Filed Aug. 28, 1959, Ser. No. 836,597
31 Claims. (Cl. 167—46)

This invention relates to a method for repelling birds. In one aspect, it relates to a method for rendering surfaces repellent to birds. In another aspect, it relates to a method for rendering seeds repugnant to birds normally feeding thereon by treating said seeds with a novel bird repellent. In a further aspect, it relates to a novel bird repellent.

A number of repellents for certain pests, such as insects and rodents, have been developed and are known in the art. However, very little success has been attained in a search for a material which is repellent to birds. As is well known, many birds, through their roosting habits, foul buildings, sidewalks, statues, and other sites. It is desirable for many applications to repel birds from such areas and surfaces. Also, the loss of seeds, grains, and the like, at the present time to feeding birds represents a large financial loss to the farms of this country each year, and means are needed to treat such feed so as to cause birds to have an aversion thereto.

Accordingly, it is an object of this invention to provide a method for repelling birds. Another object is to provide a method for rendering surfaces repellent to birds. Another object is to provide a novel bird repellent. A further object is to render seeds, etc. repugnant to birds normally feeding thereon by treating such feed with a novel bird repellent composition. Other objects and advantages of this invention will become apparent to those skilled in the art from the following discussion and appended claims.

We have now discovered that birds are repelled by sulfenamide compounds of the formula:

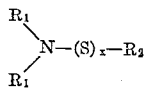

wherein $R_1$ is selected from the group consisting of hydrogen, alkyl and alkenyl radicals having from 1 to 10 carbon atoms, not more than one of said $R_1$'s being hydrogen, and wherein the two said $R_1$'s can together with N form a heterocyclic saturated ring having from 5 to 6 ring atoms, said ring atoms other than said N being selected from the group consisting of carbon, oxygen, and sulfur with at least three of said ring atoms being carbon; $R_2$ is selected from the group consisting of alkyl radicals having from 3 to 20 carbon atoms, cycloalkyl and aryl radicals having from 6 to 20 carbon atoms, and combinations thereof having from 6 to 20 carbon atoms, such as alkaryl, aralkyl, alkylcycloalkyl, and cycloalkylalkyl; $x$ is an integer from 1 to 3; and wherein the sum of $x$ plus the total number of carbon atoms in the $R_1$'s and $R_2$ is at least 8.

Representative examples of sulfenamide compounds which fall within the scope of the above formula and which can be employed as bird repellents according to the process of this invention are:

N-methyl-n-hexylsulfenamide;
N-methyl-tert-dodecylsulfenamide;
N-methylphenylsulfenamide;
N-methylcyclohexylsulfenamide;
N-ethyl-n-pentylsulfenamide;
N-methyl(ethylphenyl)sulfenamide;
N-tert-butyl-tert-octylsulfenamide;
N-2-propenyl-n-butylsulfenamide;
N-3-butenyl-n-propylsulfenamide;
N,N-dimethyl-tert-pentylsulfenamide;
N,N-dimethyl-n-pentylsulfenamide;
N,N-dimethyl-tert-hexylsulfenamide;
N,N-dimethyl-tert-heptylsulfenamide;
N,N-dimethyl-([4-n-butylphenyl]decyl)sulfenamide;
N,N-diethyl-tert-butylsulfenamide;
N,N-diethyl-tert-octylsulfenamide;
N,N-di-n-propyl-tert-octylsulfenamide;
N,N-methylethyl-isobutylsulfenamide;
N,N-diallyl-tert-butylsulfenamide;
N,N-di-3-pentenyl(3-methylcyclohexyl)sulfenamide;
N,N-di-n-butyl-tert-butylsulfenamide;
N,N-di-isobutyl-tert-octylsulfenamide;
N,N-di-n-butylphenylsulfenamide;
N,N-di-n-butyl-tert-butylsulfenamide;
N,N-di-n-butyl(phenylethyl)sulfenamide;
N,N-di-sec-decyleicosulfenamide;
N,N-di-n-nonylphenylsulfenamide;
N,N-di-n-decylcyclohexylsulfenamide;
N,N-tetramethylene-n-butylsulfenamide;
N,N-pentamethylene-tert-butylsulfenamide;
N,N-tetramethylenephenylsulfenamide;
N,N-tetramethylenecyclohexylsulfenamide;
N,N-pentamethylene-tert-octylsulfenamide;
N,N-pentamethylenebenzylsulfenamide;
N,N-pentamethylenephenylsulfenamide;
N,N-2-oxatetramethylene-n-butylsulfenamide;
N,N-3-oxapentamethylene-tert-octylsulfenamide;
N,N-3-oxapentamethylenephenylsulfenamide;
N,N-1-thiatetramethylene-n-butylsulfenamide;
N,N-2-thiapentamethylene-n-propylsulfenamide;
N,N-3-thiapentamethylenephenylsulfenamide;
N,N-1,3-dioxapentamethyleneisopropylsulfenamide;
N,N-1,3-dithiapentamethylenecyclohexylsulfenamide;
N,N-2-oxa-4-thiapentamethylene-sec-butylsulfenamide;
N,N-methylethyl-n-propylthiosulfenamide;
N,N-diethyl-n-propylthiosulfenamide;
N,N-diethyl-isopropylthiosulfenamide;
N,N-diethyl-tert-butylthiosulfenamide;
N,N-di-n-propyl-sec-hexylthiosulfenamide;
N,N-di-tert-butyl-n-hexylthiosulfenamide;
N,N-dimethyl-tert-octylthiosulfenamide;
N,N-di-n-heptylethylthiosulfenamide;
N,N-dimethyl-p-tolylthiosulfenamide;
N-methyl-n-butyldithiosulfenamide;
N,N-2-oxapentamethylenephenylthiosulfenamide;
N,N-3-oxapentamethylene-n-decylthiosulfenamide;
N,N-3-thiapentamethylene-n-eicosylthiosulfenamide;
N-methyl-n-butyldithiosulfenamide;
N,N-diethylphenyldithiosulfenamide;
N,N-methylethylcyclohexyldithiosulfenamide;
N,N-di-n-propyl-n-propyldithiosulfenamide;
N,N-diethyl(phenylethyl)dithiosulfenamide;
N-decenyl([2-methylcyclohexyl]propyl)dithiosulfenamide;
N,N-di-n-octyl-3-phenyltetradecyldithiosulfenamide;
N,N-pentamethylene-n-butyldithiosulfenamide;
N,N-3-oxapentamethylenephenyldithiosulfenamide;
N,N-1-thiatetramethylene-p-tolyldithiosulfenamide;
N-2-propenyl-n-eicosyldithiosulfenamide; and the like.

The bird repellents of this invention can be applied to many different types of surfaces which it is desired to render repellent to birds. For example, these materials can be applied to grain, fruit trees, seeds, tree seedlings, window ledges and the like.

The bird repellents of this invention can be applied for their intended purpose as the pure compound, or in combination with a carrier or inert materials as in solution or emulsion. Solvents or carriers should be used which are substantially inert with respect to the active repellent. Some examples of carrier materials which can be employed are acetone, deodorized kerosene, naphthas, isoparaffinic hydrocarbon fractions boiling in the approximate range of 260 to 800° F. (Soltrol), and the like. If desired, the bird repellents of this invention can be applied as aqueous emulsions, in which case a suitable emulsifying or wetting agent is employed. The repellent materials can also be applied as a dust, using such solid carriers as kieselguhr, and the like. In addition, the materials for repelling birds can be applied to surfaces from which it is desired to repel these animals in conjunction with an adhesive.

The bird repellents of this invention can be applied in the above described forms by spraying, brushing, dusting, etc. The usually preferred method of application is by spraying a liquid composition on the surface to be treated. When applying the repellents of this invention in a solvent or carrier, the liquid compositions normally contain from 0.1 to 10 weight percent of one of the described sulfenamides, thiosulfenamides and dithiosulfenamides, although concentrations above and below this range can be used. When these materials are applied in the form of dust, the concentrations of the active ingredient is preferably within the range between 1 and 20 weight percent, although concentrations above and below this range are applicable.

The bird repellents of this invention are usually applied to a surface in a manner so as to deposit an amount within the range between 1 and 100 grams of the active repellent material per each 100 square feet of surface from which birds are to be repelled. Larger or smaller amounts can be applied, if desired, although larger amounts are generally uneconomical.

When the bird repellents of this invention are applied to feeds, grains, or the like, application is made so as to deposit between 0.05 and 5 weight percent, based on the feed, of the active repellent. A more preferred range is from 0.1 to 2 weight percent. Feed normally consumed by birds and treated according to this invention to cause birds to have an aversion thereto include rice, wheat, barley, kale, oats, corn, rye, sorghum, kaffir corn, fruit, and planted seeds of flowers, vegetables, and the like.

The bird repellents of this invention are known compounds, and can be prepared by several known methods. For example, sulfenamides of the type herein described can be prepared by the reaction of suitable alkylsulfenyl chlorides with primary or secondary amines.

The following examples illustrate the advantages of this invention. It is to be understood that the specific compounds, amounts and other conditions in these examples are merely illustrative and should not be construed so as to unduly limit the invention.

EXAMPLE I

A number of runs were made in which certain of the repellent compounds of this invention were evaluated as bird repellents for baby chickens. In each of these runs, a solution of 0.5 gram of the desired sulfenamide, thiosulfenamide or dithiosulfenamide in 20 cc. of acetone was applied to 50 grams of prepared chicken feed. In each run, the chicken feed was thoroughly mixed with the solution, after which the acetone was evaporated from the feed. Fifty grams of the treated feed was placed in each case in a cage with two hungry baby chickens. The amounts of treated feed remaining at the end of the first and second days was estimated, and on the third and final day the amount of feed consumed was determined by weighing, unless all of the feed had been eaten. Untreated feed was completely consumed before the end of the first day. For purposes of control, a sulfenamide compound outside the scope of this invention was also evaluated (run No. 10). The results of these runs, set forth in Table I, show that the active repellent ingredients of this invention are effective in repelling birds.

Table I

| Run No. | Compound | Amount of Feed Consumed, g. | | |
|---|---|---|---|---|
| | | 1st day | 2nd day | 3rd day |
| 1 | N,N-pentamethylene-tert-octylsulfenamide | 7.5 | 12.5 | 30 |
| 2 | N,N-diethyl-tert-octylsulfenamide | 10 | 15 | 32 |
| 3 | N,N-dimethyl-tert-butyldithiosulfenamide | 10 | 15 | 38 |
| 4 | N,N-dimethyl-tert-hexylsulfenamide | 10 | 25 | 42 |
| 5 | N,N-diallyl-tert-butylsulfenamide | 10 | 25 | 37 |
| 6 | N,N-dimethyl-tert-octylthiosulfenamide | 10 | 20 | 37 |
| 7 | N,N-pentamethylene-tert-butylsulfenamide | 25 | 30 | 37 |
| 8 | N,N-dimethyl-tert-heptylsulfenamide | 15 | 30 | 50 |
| 9 | N-methyl-tert-dodecylsulfenamide | 30 | 35 | 50 |
| 10 | N,N-dimethyl-tert-butylsulfenamide | 50 | | |

Run 10 above is a control run, as the compound employed is outside the scope of the invention.

EXAMPLE II

Another series of runs were carried out in which the repellents of this invention were evaluated as repellents for Coturnix quail. In each of these runs, 100 grams of feed was treated with a solution of one gram of one of the sulfenamides of this invention in 40 cc. of acetone. In each run the solvent was evaporated, and the dried feed was placed in a cage with four hungry Coturnix quail. The amount of feed consumed on the first and second days was estimated, and the amount remaining on the third day was determined by weighing unless all the feed had been eaten. The quail will eat all of the 100 grams on the first day if the treating agent is not repellent, or if the feed is not treated. The results of these tests are set forth in Table II.

Table II

| Run No. | Compound | Amount of Feed Consumed, g. | | |
|---|---|---|---|---|
| | | 1st day | 2nd day | 3rd day |
| 1 | N,N-3-oxapentamethylene-tert-octylsulfenamide. | 0 | 15 | 70 |
| 2 | N,N-di-n-propyl-tert-octylsulfenamide | 5 | 65 | 82 |
| 3 | N,N-di-n-butylphenylethylsulfenamide | 10 | 15 | 38 |
| 4 | N,N-di-n-butylphenylsulfenamide | 10 | 15 | 42 |
| 5 | N-tert-butyl-tert-octylsulfenamide | 20 | 75 | 90 |

EXAMPLE III

In this example, pans of treated and untreated grain were exposed to birds on the roof of a building in a municipal area heavily frequented by sparrows, pigeons, and other varieties of birds.

An amount of 340 grams of sorghum grain was treated with a solution of 3.4 grams of N,N-di-n-butylphenylsulfenamide dissolved in 30 cc. of acetone. The solvent was then evaporated off and the treated grain was placed in a pan in the above-described location. A pan containing the same amount of untreated grain was placed in the same location. Daily observations were made on the amounts of treated and untreated grain which had been consumed by the birds. Since the untreated grain was eaten very rapidly, it was necessary to replenish the untreated grain a number of times. The effectiveness of the repellent was calculated by the formula:

Percent repellency =

$$\frac{\text{amount of treated grain consumed during 14-day period}}{\text{amount of untreated grain consumed during 14-day period}} \times 100$$

By the method of this example, the N,N-di-n-butylphenylsulfenamide was 99.5 percent repellent.

The bird repellents of this invention can be employed in admixture with other bird repellents and/or other agents such as insecticides, fungicides and the like. It is to be understood that mixtures of such agents will be selected so that one agent will not have a deleterious effect on the others.

Various modifications and alterations of this invention will become apparent to those skilled in the art without departing from the spirit and scope of this invention, and it should be understood that the foregoing disclosure and discussion should not be construed so as to unduly limit the invention.

We claim:

1. A method of repelling birds from seed in a field which comprises treating said seed before distributing it in said field with N,N-di-n-butylphenylsulfenamide.

2. A seed protected against ravaging or eating by birds, said seed having been treated with N,N-di-n-butylphenylsulfenamide.

3. A method of repelling birds from material which otherwise the birds would eat or ravage, comprising treating said material with N,N-pentamethylene-tert-octylsulfenamide.

4. A material protected against ravaging or eating by birds and which otherwise would be eaten or ravaged by birds, said material having been treated with N,N-pentamethylene-tert-octylsulfenamide.

5. A method of repelling birds from material which otherwise the birds would eat or ravage, comprising treating said material with N,N-diethyl-tert-octylsulfenamide.

6. A material protected against ravaging or eating by birds and which otherwise would be eaten or ravaged by birds, said material having been treated with N,N-diethyl-tert-octylsulfenamide.

7. A method of repelling birds from material which otherwise the birds would eat or ravage, comprising treating said material with N,N-dimethyl-tert-butyldithiosulfenamide.

8. A material protected against ravaging or eating by birds and which otherwise would be eaten or ravaged by birds, said material having been treated with N,N-dimethyl-tert-butyldithiosulfenamide.

9. A method of repelling birds from material which otherwise the birds would eat or ravage, comprising treating said material with N,N-dimethyl-tert-hexylsulfenamide.

10. A material protected against ravaging or eating by birds and which otherwise would be eaten or ravaged by birds, said material having been treated with N,N-dimethyl-tert-hexylsulfenamide.

11. A method of repelling birds from material which otherwise the birds would eat or ravage, comprising treating said material with N,N-diallyl-tert-butylsulfenamide.

12. A material protected against ravaging or eating by birds and which otherwise would be eaten or ravaged by birds, said material having been treated with N,N-diallyl-tert-butylsulfenamide.

13. A method of repelling birds from material which otherwise the birds would eat or ravage, comprising treating said material with N,N-dimethyl-tert-octylthiosulfenamide.

14. A material protected against ravaging or eating by birds and which otherwise would be eaten or ravaged by birds, said material having been treated with N,N-dimethyl-tert-octylthiosulfenamide.

15. A method of repelling birds from material which otherwise the birds would eat or ravage, comprising treating said material with N,N-pentamethylene-tert-butylsulfenamide.

16. A material protected against ravaging or eating by birds and which otherwise would be eaten or ravaged by birds, said material having been treated with N,N-pentamethylene-tert-butylsulfenamide.

17. A method of repelling birds from material which otherwise the birds would eat or ravage, comprising treating said material with N,N-dimethyl-tert-heptylsulfenamide.

18. A material protected against ravaging or eating by birds and which otherwise would be eaten or ravaged by birds, said material having been treated with N,N-dimethyl-tert-heptylsulfenamide.

19. A method of repelling birds from material which otherwise the birds would eat or ravage, comprising treating said material with N-methyl-tert-dodecylsulfenamide.

20. A material protected against ravaging or eating by birds and which otherwise would be eaten or ravaged by birds, said material having been treated with N-methyl-tert-dodecylsulfenamide.

21. A method of repelling birds from material which otherwise the birds would eat or ravage, comprising treating said material with N,N-3-oxapentamethylene-tert-octylsulfenamide.

22. A material protected against ravaging or eating by birds and which otherwise would be eaten or ravaged by birds, said material having been treated with N,N-3-oxapentamethylene-tert-octylsulfenamide.

23. A method of repelling birds from material which otherwise the birds would eat or ravage, comprising treating said material with N,N-di-n-propyl-tert-octylsulfenamide.

24. A material protected against ravaging or eating by birds and which otherwise would be eaten or ravaged by birds, said material having been treated with N,N-di-n-propyl-tert-octylsulfenamide.

25. A method of repelling birds from material which otherwise the birds would eat or ravage, comprising treating said material with N,N-di-n-butyl-phenylethylsulfenamide.

26. A material protected against ravaging or eating by birds and which otherwise would be eaten or ravaged by birds, said material having been treated with N,N-di-n-butylphenylethylsulfenamide.

27. A method of repelling birds from material which otherwise the birds would eat or ravage, comprising treating said material with N,N-di-n-butyl-phenylsulfenamide.

28. A material protected against ravaging or eating by birds and which otherwise would be eaten or ravaged by birds, said material having been treated with N,N-di-n-butylphenylsulfenamide.

29. A method of repelling birds from material which otherwise the birds would eat or ravage, comprising treating said material with N-tert-butyl-tert-octylsulfenamide.

30. A material protected against ravaging or eating by birds and which otherwise would be eaten or ravaged by birds, said material having been treated with N-tert-butyl-tert-octylsulfenamide.

31. A method of repelling birds from materials which otherwise the birds would eat or ravage which comprises treating said material with a composition comprising a carrier adjuvant and from 0.1 to 20 weight percent of N,N-di-n-butylphenylsulfenamide.

References Cited in the file of this patent

UNITED STATES PATENTS

| | | |
|---|---|---|
| 2,358,786 | Bogert et al. | Sept. 26, 1944 |
| 2,401,234 | Farlow | May 28, 1946 |
| 2,432,256 | Skaptason | Dec. 9, 1947 |
| 2,474,237 | Eby | June 28, 1949 |
| 2,811,478 | Manzelli et al. | Oct. 29, 1957 |
| 2,862,849 | Pray et al. | Dec. 2, 1958 |
| 2,955,980 | Goodhue et al. | Oct. 11, 1960 |